(12) United States Patent
Ryan

(10) Patent No.: US 6,867,944 B1
(45) Date of Patent: Mar. 15, 2005

(54) DISK DRIVE COMPRISING VCM STALL DETECTOR FOR VELOCITY CONTROL OF AN ACTUATOR ARM

(75) Inventor: Robert P. Ryan, Mission Viejo, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 531 days.

(21) Appl. No.: 09/703,689

(22) Filed: Oct. 31, 2000

(51) Int. Cl.$^7$ .............................................. G11B 5/596
(52) U.S. Cl. ..................................... 360/78.04; 360/75
(58) Field of Search ........................... 360/75; 318/561, 318/254, 569

(56) References Cited

U.S. PATENT DOCUMENTS

| | | | | |
|---|---|---|---|---|
| 5,297,024 A | * | 3/1994 | Carobolante | 360/67 |
| 5,384,524 A | * | 1/1995 | Romano | 318/569 |
| 5,663,846 A | * | 9/1997 | Masuoka et al. | 360/75 |
| 5,781,363 A | * | 7/1998 | Rowan et al. | 360/78.09 |
| 5,982,130 A | * | 11/1999 | Male | 318/615 |
| 6,021,015 A | * | 2/2000 | Jeffrey et al. | 360/69 |
| 6,163,430 A | * | 12/2000 | Hansen | 360/78.06 |

* cited by examiner

*Primary Examiner*—David Hudspeth
*Assistant Examiner*—K. Wong
(74) *Attorney, Agent, or Firm*—Milad G. Shara, Esq.; Howard H. Sheerin, Esq.

(57) ABSTRACT

The present invention may be regarded as a disk drive comprising a disk, a head, an actuator arm for actuating the head radially over the disk, and a voice coil motor (VCM) for rotating the actuator arm about a pivot, the VCM comprising a coil comprising a VCM resistance R. A back EMF voltage detector measures a back EMF voltage across the coil, and a current detector detects a current I flowing through the coil. An IR voltage detector, responsive to the current I detected by the current detector, detects an IR voltage proportional to the current I times the VCM resistance R. A voltage compensator substantially cancels the IR voltage from the measured back EMF voltage to generate a compensated back EMF voltage. A control voltage generator, responsive the compensated back EMF voltage, generates a control voltage applied to the coil to generate the current I flowing through the coil. A stall detector compares the current I detected by the current detector to a threshold, wherein a VCM stall condition is detected if the current I exceeds the threshold for a predetermined interval.

6 Claims, 4 Drawing Sheets

US 6,867,944 B1

DISK DRIVE COMPRISING VCM STALL DETECTOR FOR VELOCITY CONTROL OF AN ACTUATOR ARM

CROSS REFERENCE TO RELATED APPLICATIONS AND PATENTS

This application is related to co-pending patent application Ser. No. 09/704,175 entitled "DISK DRIVE EMPLOYING VCM DEMAND CURRENT TO CALIBRATE VCM IR VOLTAGE FOR VELOCITY CONTROL OF AN ACTUATOR ARM", and Ser. No. 09/704,195 entitled "DISK DRIVE EMPLOYING SEEK TIME VCM IR VOLTAGE CALIBRATION FOR VELOCITY CONTROL OF AN ACTUATOR ARM", both filed concurrently with the present application, the disclosures of which are incorporated herein by reference.

BACKGROUND OF THE INVENTION

1. Field of the Invention

The present invention relates to disk drives for computer systems. More particularly, the present invention relates to a disk drive comprising a VCM stall detector for velocity control of an-actuator arm.

2. Description of the Prior Art

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo control system to control the velocity of the actuator arm as it seeks from track to track.

There are times when the servo control system does not have access to the embedded servo sectors yet it is still desirable to control the velocity of the actuator arm. For example, in disk drives wherein the head is parked on a landing-zone of the disk, it is desirable to control the velocity of the actuator arm to unlatch the head during spin-up. In disk drives employing ramp loading/unloading, it is desirable to control the velocity of the actuator arm so that the head is not damaged as it travels off the ramp onto the disk as well as off the disk onto the ramp. Another example is if the servo control system loses servo sector synchronization it is desirable to control the velocity of the actuator arm to facilitate re-synchronizing to the servo sectors.

Prior art techniques for controlling the velocity of the actuator arm when servo sector information is unavailable include using a voltage loop with the detected back EMF generated by the VCM as the feedback. The VCM is essentially an RLC circuit where R is resistance, L inductance, and C the inertia of the motor and load. The voltage contribution of C to the measured back EMF is proportional to the velocity of the VCM. Since the resistance R is in series with C, it is desirable to cancel R's contribution to the back EMF leaving only LC. Once the resistance R is canceled, at low frequencies Ldi/dt is small leaving the voltage contribution of C as the dominant factor in the measured back EMF.

Prior art techniques for performing VCM resistance compensation include calibrating and subtracting from the measured back EMF the voltage contribution of R (i.e., the IR voltage where I is the current in the VCM). The VCM resistance R is measured by applying a fixed current to the VCM in order to press the actuator arm against a fixed object (e.g., the crash-stop for stopping the head at the inner diameter (ID)). With the actuator arm pressed against the fixed object, the velocity is zero and Ldi/dt is zero, leaving the VCM resistance R as the only contribution to the measured back EMF.

If the IR voltage is completely canceled from the measured back EMF, it would result in an under-damped or unstable system. Thus, it is desirable to decrease the measured VCM resistance R by a small offset to leave a relatively small amount of IR voltage in the measured back EMF. It is also desirable to detect when the motor stalls to prevent overheating and overstressing the VCM. The VCM will stall, for example, at the end of an unload (or parking) operation when the head latches, at the beginning of a load (or unparking) operation if the head fails to unlatch, or if the drive fails to synchronize to the embedded servo sectors during a load operation and the actuator arm crashes into the ID crash-stop. Detecting a failure to unlatch during a load (unpark) operation also saves time during drive initialization. However, because a small amount of VCM resistance R is not canceled to achieve an over-damped system, when the VCM stalls the measured back EMF will actually rise giving a false indication that the actuator arm is still moving.

There is, therefore, a need to detect VCM stall conditions to prevent overheating and overstressing the VCM, while still allowing a small amount of effective VCM resistance R to achieve an over-damped velocity controlled system.

SUMMARY OF THE INVENTION

The present invention may be regarded as a disk drive comprising a disk, a head, an actuator arm for actuating the head radially over the disk, and a voice coil motor (VCM) for rotating the actuator arm about a pivot, the VCM comprising a coil comprising a VCM resistance R. A back EMF voltage detector measures a back EMF voltage across the coil, and a current detector detects a current I flowing through the coil. An IR voltage detector, responsive to the current I detected by the current detector, detects an IR voltage proportional to the current I times the VCM resistance R. A voltage compensator substantially cancels the IR voltage from the measured back EMF voltage to generate a compensated back EMF voltage. A control voltage generator, responsive the compensated back EMF voltage, generates a control voltage applied to the coil to generate the current I flowing through the coil. A stall detector compares the current I detected by the current detector to a threshold, wherein a VCM stall condition is detected if the current I exceeds the threshold for a predetermined interval.

In one embodiment, the current detector comprises a sense resistor in series with the coil. In another embodiment, the stall detector comprises a clock and a counter for counting a number of clock cycles the current I exceeds the threshold.

The present invention may also be regarded as a method of controlling velocity of an actuator arm in a disk drive. The disk drive comprises a disk, a head, the actuator arm, and a voice coil motor (VCM) for rotating the actuator arm about a pivot. The VCM comprises a coil comprising a VCM resistance R. A control voltage is generated from a command input and a compensated back EMF voltage. The control voltage is applied to the coil to generate a current I flowing through the coil to move the actuator arm during a seek operation. A back EMF voltage across the coil, a current I flowing through the coil, and an IR voltage proportional to the current I times the VCM resistance R, are detected. The IR voltage is subtracted from the back EMF voltage detected across the coil to generate the compensated back EMF voltage. The current I is compared to a threshold, and a VCM stall condition is detected if the current I exceeds the threshold for a predetermined interval.

DESCRIPTION OF THE PREFERRED EMBODIMENTS

Figure 1:
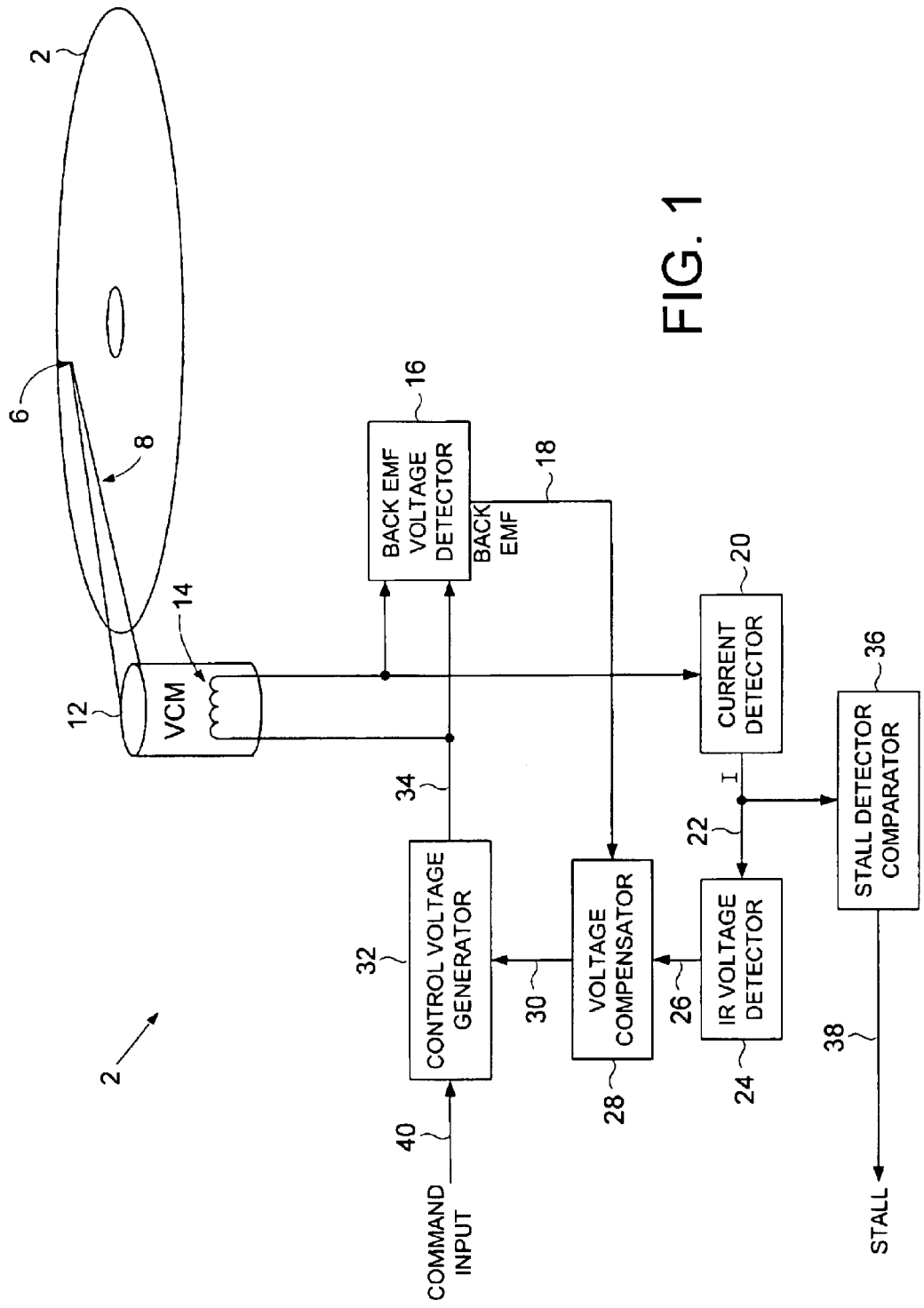
FIG. 1 shows a disk drive according to an embodiment of the present invention as comprising a back EMF voltage detector, a current detector, an IR voltage detector, a voltage compensator for substantially canceling the IR voltage from the back EMF voltage measurement, and a stall detector for detecting a VCM stall condition.

FIG. 1 shows a disk drive 2 according to an embodiment of the present invention as comprising a disk 4, a head 6, an actuator arm 8 for actuating the head 6 radially over the disk 4, and a voice coil motor (VCM) 12 for rotating the actuator arm 8 about a pivot, the VCM 12 comprising a coil 14 comprising a VCM resistance R. A back EMF voltage detector 16 measures a back EMF voltage 16 across the coil 14, and a current detector 20 detects a current I 22 flowing through the coil 14. An IR voltage detector 24, responsive to the current I 22 detected by the current detector 20, detects an IR voltage 26 proportional to the current I 22 times the VCM resistance R. A voltage compensator 28 substantially cancels the TR voltage 26 from the measured back EMF voltage 18 to generate a compensated back EMF voltage 30. A control voltage generator 32, responsive the compensated back EMF voltage 30, generates a control voltage 34 applied to the coil 14 to generate the current I 22 flowing through the coil 14. A stall detector 36 compares the current I 22 detected by the current detector 20 to a threshold, wherein a VCM stall condition 38 is detected if the current I 22 exceeds the threshold for a predetermined by interval.

In the embodiment of FIG. 1, a command input 40 is generated by a servo control system (not shown) which controls the desired radial position of the head 6 with respect to the tracks recorded on the disk 4. The command input 40 may also be set independent of the servo controller, for example, to facilitate parking the head 6 during a power failure or spindle speed fault mode.

Figure 2:
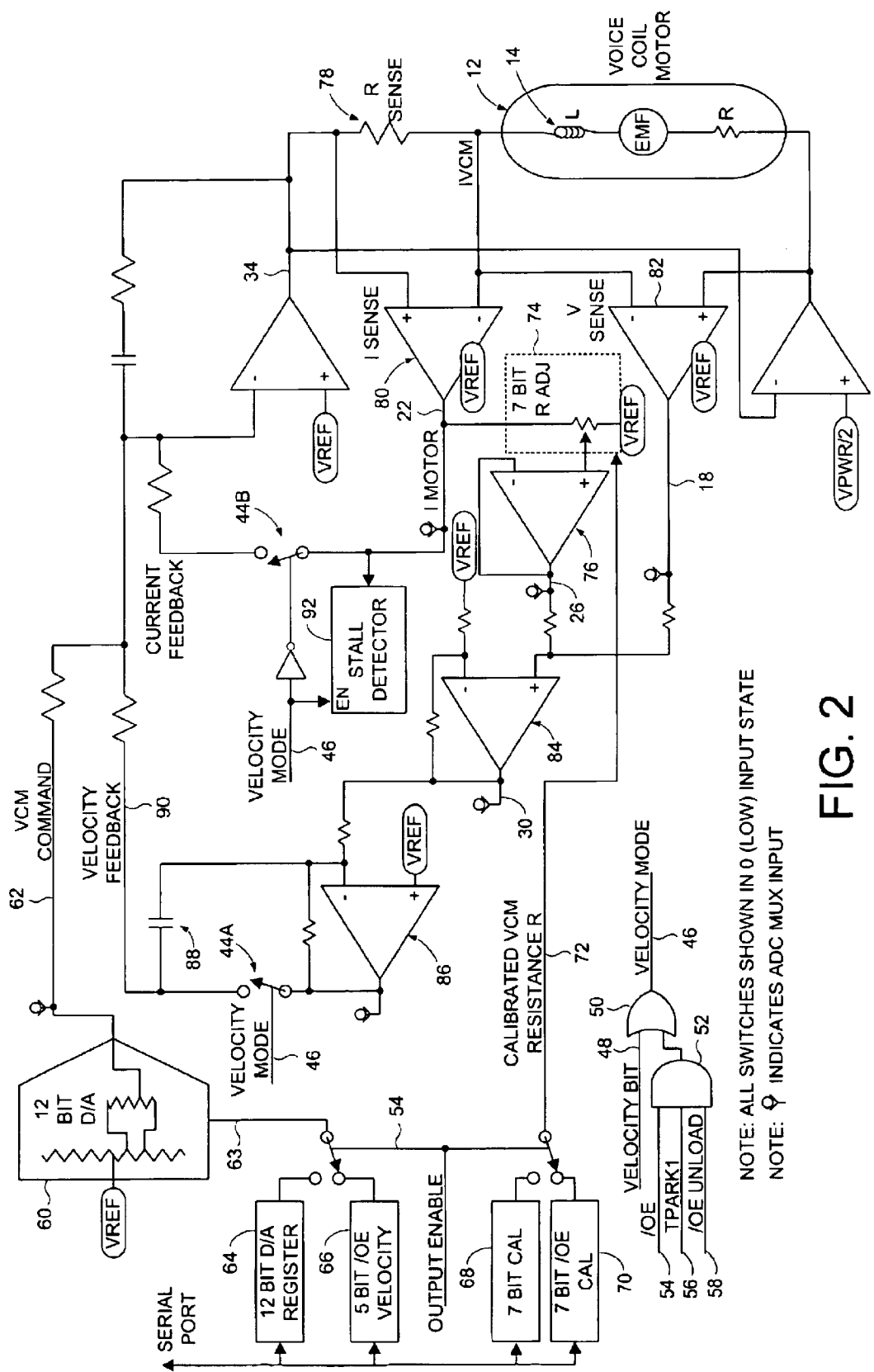
FIG. 2 shows suitable circuitry for implementing the components in the disk drive shown in FIG. 1 .

FIG. 2 shows suitable circuitry for implementing the control voltage generator 32, back EMF voltage detector 16, current detector 20, IR voltage detector 24, and voltage compensator 28, of FIG. 1. Other circuitry, firmware, or combinations thereof may be employed in alternative embodiments. The circuit of FIG. 2 operates in a normal operating mode wherein the VCM 12 is driven by a current controlled feedback loop, and in a velocity control mode wherein the VCM 12 is driven by a voltage controlled feedback loop. When in the normal operating mode, switch 44A is opened and switched 44B is closed to configure the current feedback loop, and when in the velocity control mode, switch 44A is closed and switch 44B is opened to configure the voltage feedback loop. A velocity mode control signal 46 configures the switches 44A and 44B for velocity control mode when the embedded servo information is not available for servo controlling the velocity of the actuator arm 8. A velocity bit 48 may be set by a controller (e.g., a servo controller) to activate the velocity mode control signal 46 via OR gate 50. The velocity bit 48 may be set during controlled modes of operation, such as during a load/unload operation or when synchronization to the embedded servo data is lost. The velocity mode control signal 46 may also be activated via AND gate 52 and OR gate 50 during power down or power failure. If the OE UNLOAD signal 58 has been preset to configure the drive for velocity mode unload, when a power down or power failure is detected, the control signals OUTPUT ENABLE (OE) 54 and TPARK1 56 are automatically activated, thereby activating the velocity mode control signal 46.

A digital-to-analog (D/A) converter 60 generates an analog VCM command signal 62 in response to a digital command input signal 63. A digital register 64 is programmed with an operating command input during normal operation, and a digital register 66 is programmed with a velocity mode command input used during power down or power failure to park the head 6. A digital register 68 stores a calibrated VCM resistance R value 72 for use during velocity control mode when the velocity bit 48 is activated (e.g., when calibrating the detected IR voltage 26). After calibrating the detected IR voltage 26 a digital register 70 stores the calibrated VCM resistance R value 72 for use during power down or power failure. The calibrated VCM resistance R value 72 is used to program a programmable resistor 74 in order to calibrate the detected IR voltage 26. For more information on calibrating the IR voltage 26, see the above-referenced co-pending patent applications "DISK DRIVE EMPLOYING VCM DEMAND CURRENT TO CALIBRATE VCM IR VOLTAGE FOR VELOCITY CONTROL OF AN ACTUATOR ARM" and "DISK DRIVE EMPLOYING SEEK TIME VCM IR VOLTAGE CALIBRATION FOR VELOCITY CONTROL OF AN ACTUATOR ARM."

A sense resistor 78 and amplifier 80 implement a suitable current detector 20 for a voltage representing the current 1 22 flowing through the coil 14. With the voltage representing the current I 22 applied to the programmable resistor 74, the output of amplifier 76 is the calibrated IR voltage 26. An amplifier 82 measures the back EMF voltage 18 across the coil 14. The IR voltage 26 is subtracted from the measured back EMF voltage 18 such that the output voltage of amplifier 84 is the compensated back EMF voltage 30. The compensated back EMF voltage 30 is amplified by amplifier 84, and filtered by amplifier 86 and capacitor 88 to generate a velocity feed back voltage 90 representative of the velocity of the actuator arm 8. The velocity feedback voltage 90 is subtracted from the VCM command signal 62 to generate the control voltage 34 applied to the coil 14.

Figure 3:
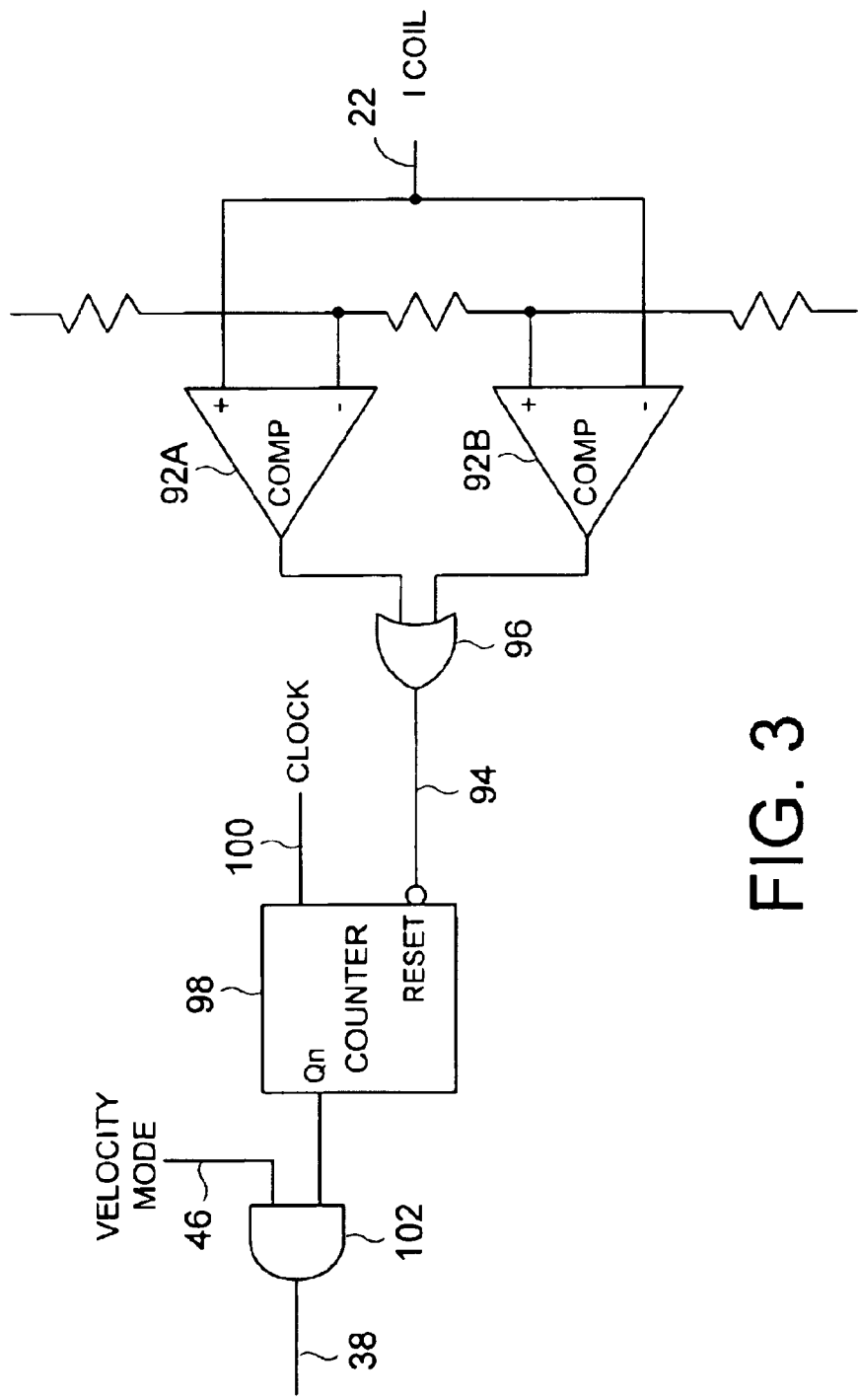
FIG. 3 shows suitable circuitry for implementing the high-current time-out detector of FIG. 3.

The stall detector 36 monitors the current I 22 flowing through the coil 14 to detect when the VCM 12 has stalled. Details of suitable circuitry for implementing the stall detector 36 are shown in FIG. 3. The current I 22 detected by the current detector 20 is compared to a positive threshold by comparator 92A and to a negative threshold by comparator 92B. If the current I exceeds either the positive or negative thresholds, a high-current signal 94 is activated via OR gate 96. The high-current signal 94 enables a counter 98 which begins counting cycles of a clock 100. If the high-current signal 94 is active for a predetermined interval (number of clock cycles), then a VCM stall condition 38 is detected. The velocity mode signal 46 enables the stall detector 36 via AND gate 102 so that the VCM stall condition 38 can only be detected during the velocity control mode.

Figure 4A:
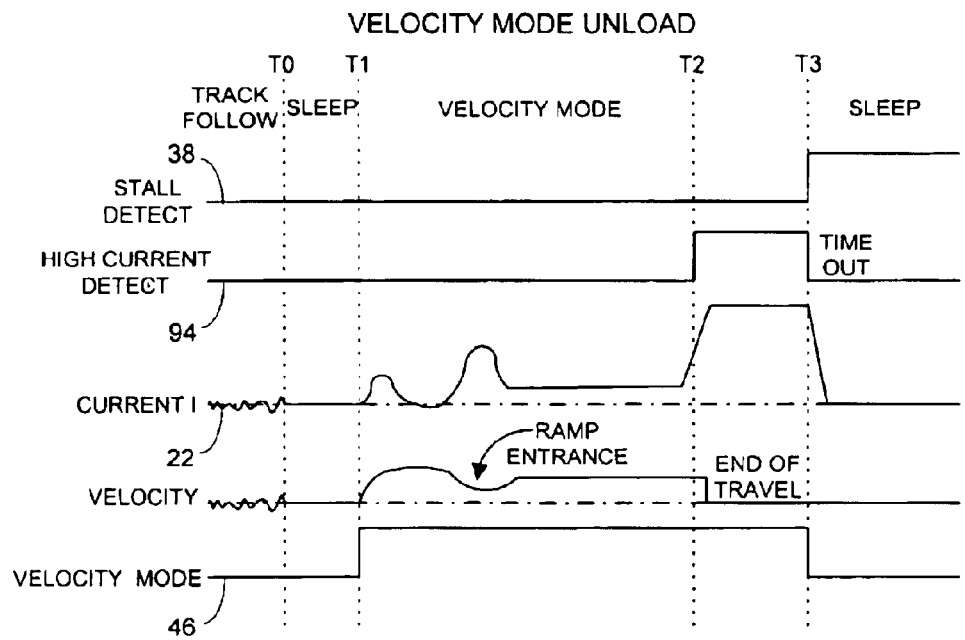
FIG. 4A is a timing diagram illustrating various signals in the disk drive during a velocity mode unload operation.

FIG. 4A is a timing diagram illustrating operation of the stall detector 36 during a normal (non-power failure) ramp unload operation wherein the head 6 is parked on a ramp at the periphery of the disk 4. At time T0 the disk drive is in a sleep mode prior to the ramp unload operation. At time T1, the current I 22 is increased to begin moving the head 6 toward the ramp, and when the head 6 reaches the ramp, the current I 22 is increased again to move the head 6 off the disk 4 onto the beginning of the ramp. The current I 22 is then held substantially constant to move the head 6 up the ramp at a substantially constant velocity. During this interval, the current I 22 does not exceed the threshold of the stall detector 36. When the head 6 reaches the end of the ramp, the current I 22 begins to ramp and at time T2 and exceeds the threshold of the stall detector 36 activating the high-current signal 94. At time T3 a stall condition 38 is detected due to the high-current signal 94 being active for the predetermined interval of the stall detector 36. The current I 22 is turned off in response to the stall condition 38 in order to prevent overheating and overstressing the VCM 12.

Figure 4B:
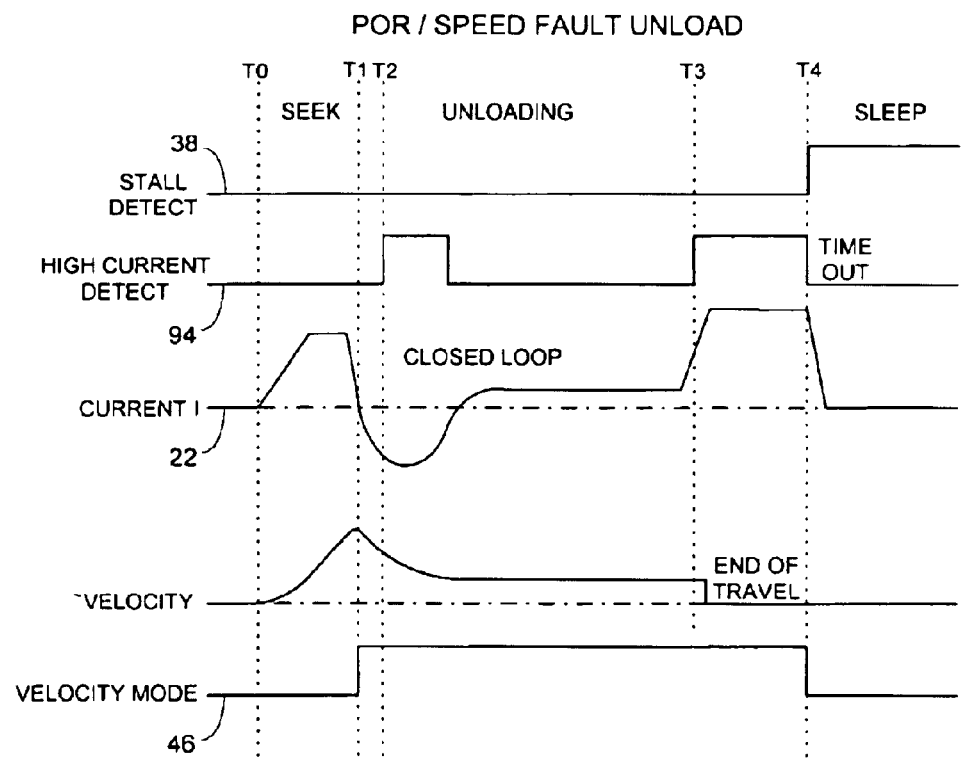
FIG. 4B is a timing diagram illustrating various signals in the disk drive during a power-on reset or speed-fault unload condition.

FIG. 4B is a timing diagram illustrating operation of the stall detector 36 during an emergency ramp unload operation (e.g., during a power-on reset (POR), power failure, or speed fault condition). At time T0, the disk drive begins performing a seek toward the outer diameter of the disk 4. At time T1, a power failure is detected and the velocity mode 46 is activated. The current I 22 is ramped with opposite polarity to decelerate the actuator arm 8, and at time T2, the current I 22 exceeds the threshold of the stall detector 36 activating the high-current signal 94. As the actuator arm 8 decelerates, the current I 22 falls below the threshold of the stall detector 36 thereby deactivating the high-current signal 94. Since the duration of the high-current signal 94 does not exceed the predetermined interval of the stall detector 36, a stall condition 38 is not detected as desired. When the head 6 reaches the end of the ramp, the current I 22 begins to ramp and at time T3 and exceeds the threshold of the stall detector 36 activating the high-current signal 94. At time T4 a stall condition 38 is detected due to the high-current signal 94 being active for the predetermined interval of the stall detector 36. The current I 22 is turned off in response to the stall condition 38 in order to prevent overheating and overstressing the VCM 12.

Detecting when the current I 22 exceeds a predetermined threshold to detect a stall condition, rather than detecting when the compensated back EMF voltage 30 falls to zero, allows a small amount of VCM resistance R to remain in the calibrated IR voltage 26, thereby achieving an over-damped, stable velocity controlled system. Further, not detecting a stall condition until the current I 22 exceeds a predetermined threshold for a predetermined interval avoids detecting false stall conditions as illustrated in FIG. 4B

I claim:

1. A disk drive employing a velocity controlled servo loop, the disk drive comprising:
    (a) a disk;
    (b) a head;
    (c) an actuator arm for actuating the head radially over the disk;
    (d) a voice coil motor (VCM) for rotating the actuator arm about a pivot, the VCM comprising a coil comprising a VCM resistance R;
    (e) a back EMF voltage detector for measuring a back EMF voltage across the coil;
    (f) a current detector for detecting a current I flowing through the coil;
    (g) an IR voltage detector, responsive to the current I detected by the current detector, for detecting an IR voltage proportional to the current I times the VCM resistance R;
    (h) a voltage compensator for substantially canceling the IR voltage from the measured back EMF voltage to generate a compensated back EMF voltage;
    (i) a control voltage generator, responsive the compensated back EMF voltage, for generating a control voltage applied to the coil to generate the current I flowing through the coil; and
    (j) a stall detector for comparing the current I detected by the current detector to a threshold, wherein a VCM stall condition is detected if the current I exceeds the threshold for a predetermined interval.

2. The disk drive as recited in claim 1, wherein the current detector comprises a sense resistor in series with the coil.

3. The disk drive as recited in claim 1, wherein the stall detector comprises:
    (a) a clock; and
    (b) a counter for counting a number of clock cycles the current I exceeds the threshold.

4. A method of implementing a velocity controlled servo loop in a disk drive, the disk drive comprising a disk, a head, the actuator arm, and a voice coil motor (VCM) for rotating the actuator arm about a pivot, the VCM comprising a coil comprising a VCM resistance R, the method comprising the steps of:
    (a) generating a control voltage from a command input and a compensated back EMF voltage;
    (b) applying the control voltage to the coil to generate a current I flowing through the coil to move the actuator arm;
    (c) detecting a back EMF voltage across the coil;
    (d) detecting the current I flowing through the coil;
    (e) detecting an IR voltage proportional to the current I times the VCM resistance R;
    (f) subtracting the IR voltage from the detected back EMF voltage to generate the compensated back EMF voltage;
    (g) comparing the current I to a threshold; and
    (h) detecting a VCM stall condition if the current I exceeds the threshold for a predetermined interval.

5. The method of controlling velocity of an actuator arm as recited in claim 4, wherein the step of detecting the current I comprises the step of detecting a current flowing through a sense resistor in series with the coil.

6. The method of controlling velocity of an actuator arm as recited in claim 4, wherein the step of detecting a VCM stall condition comprises the step of counting clock cycles while the current I exceeds the threshold.

* * * * *